United States Patent [19]
Wilding

[11] 3,811,585
[45] May 21, 1974

[54] METHOD OF PROCESSING TOBACCO IN A BLEND-BULK SILO

[75] Inventor: Edwin L. Wilding, Louisville, Ky.

[73] Assignee: Griffin & Company, Louisville, Ky.

[22] Filed: Jan. 22, 1973

[21] Appl. No.: 325,548

Related U.S. Application Data

[62] Division of Ser. No. 159,823, July 6, 1971, Pat. No. 3,735,881.

[52] U.S. Cl. .............................................. 214/152
[51] Int. Cl. ........................................... B65c 65/32
[58] Field of Search ......... 214/17, 17 C, 17 CA, 18, 214/18.2, 152

[56] References Cited
UNITED STATES PATENTS
3,125,231   3/1964   Mortland ........................ 214/17 D
2,946,469   7/1960   DeVaney et al. ............... 214/18.2
3,435,967   4/1969   Sackett .......................... 214/17 CA

*Primary Examiner*—Robert G. Sheridan
*Attorney, Agent, or Firm*—Wood, Herron & Evans

[57] ABSTRACT

A method for processing tobacco, which varies between a single type and a plurality of types, includes a plurality of bulk storing and blending steps. A shuttle car and conveyor carried thereon traverses a longitudinal storage bin or silo as the conveyor is controlled to deposit tobacco placed thereon into the silo beneath the conveyor. To store tobacco, the shuttle is moved incrementally while the conveyor is operated in the direction of that portion of the silo to be charged. To blend tobacco, the shuttle is reciprocated while the conveyor is operated in a direction toward that portion of the silo to be charged so as to deposit a plurality of layers into the silo. The shuttle and conveyor are operable to manually or automatically charge selected portions of the silo. The speed of the conveyor is varied in several of the blending steps to insure layers of even thicknesses. Tobacco is deposited on the conveyor by an additional shuttle and associated conveyor, the speed of the latter also being varied to insure deposited layers of even thickness on the first conveyor.

10 Claims, 17 Drawing Figures

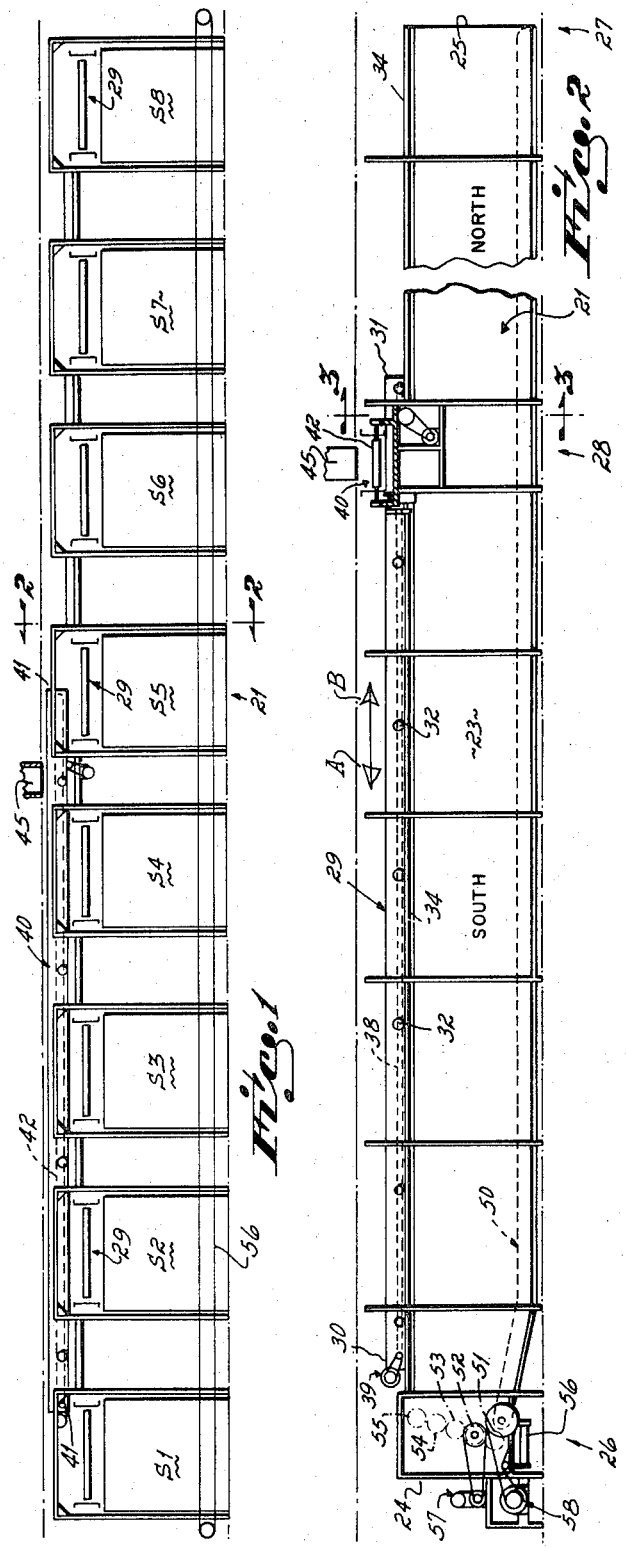

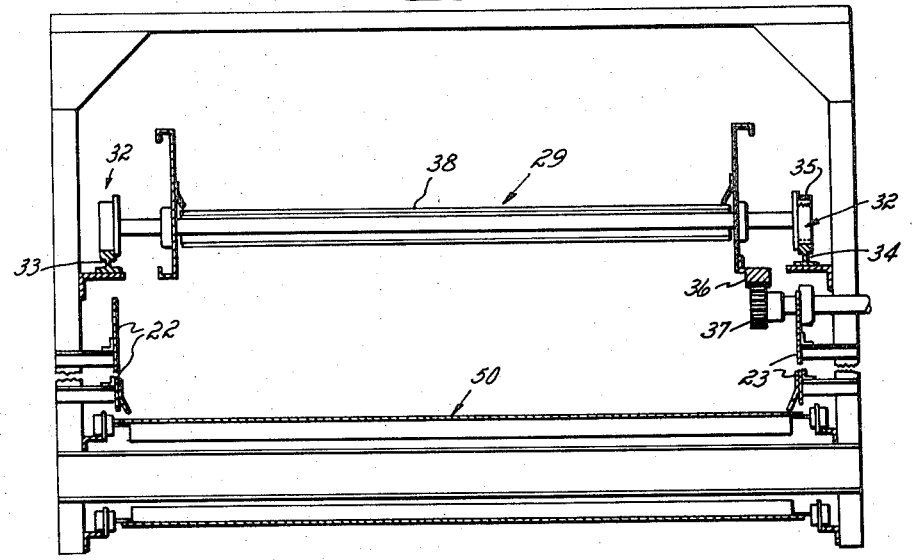
Fig. 3
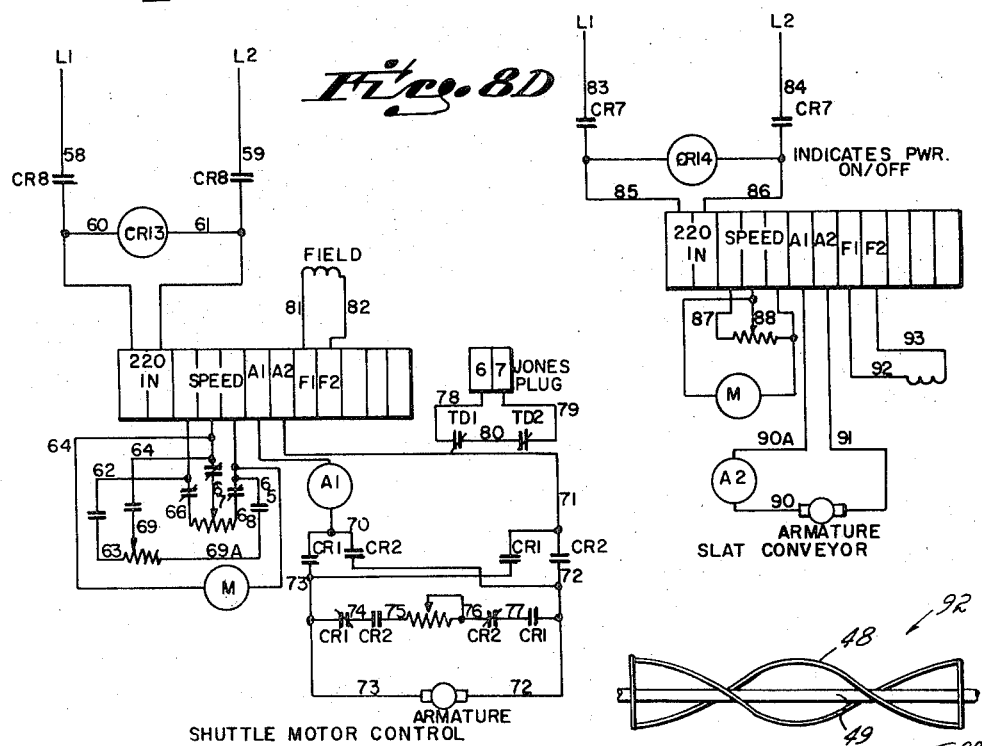
Fig. 8D
Fig. 8C
SHUTTLE MOTOR CONTROL
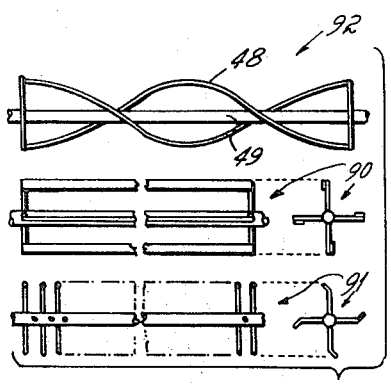
Fig. 4

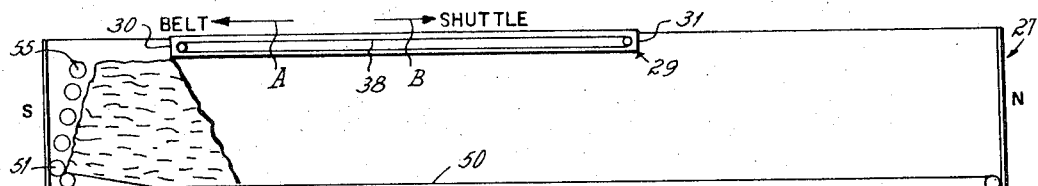
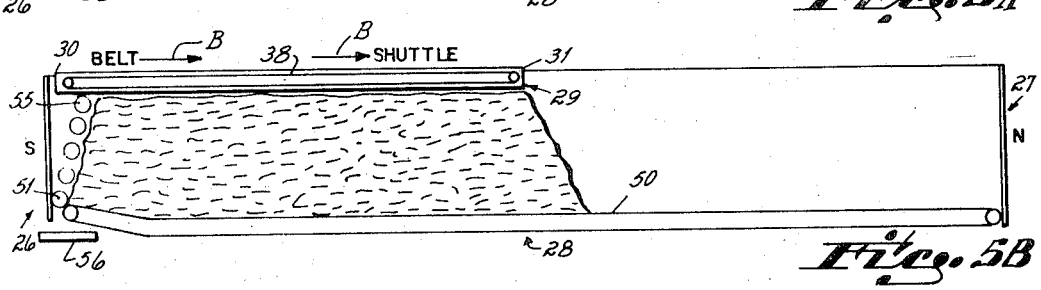
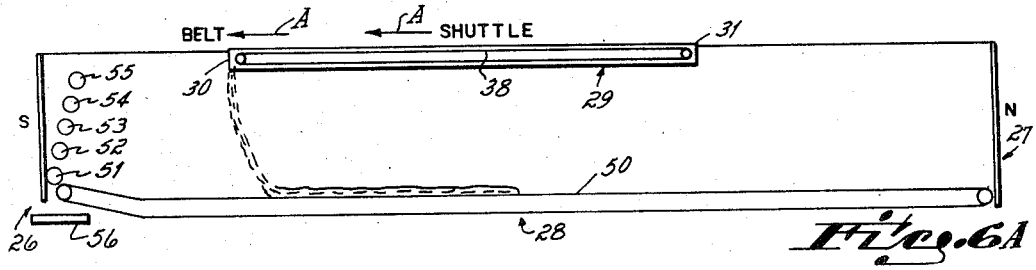
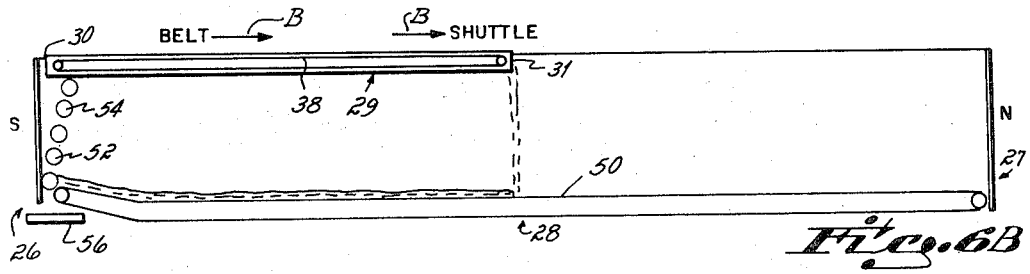
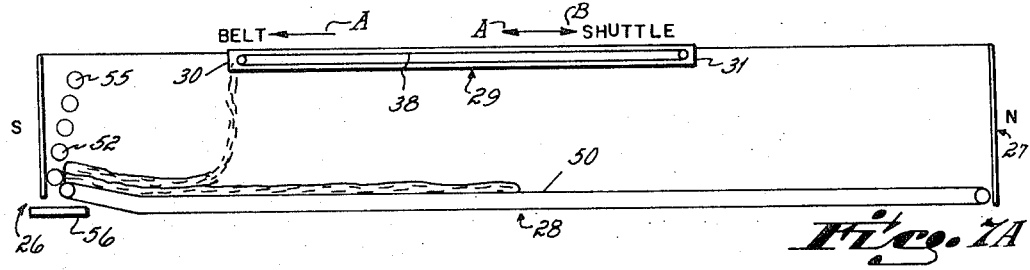
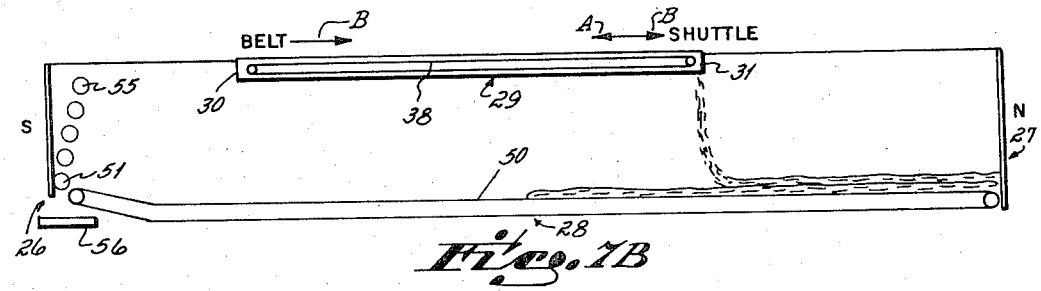

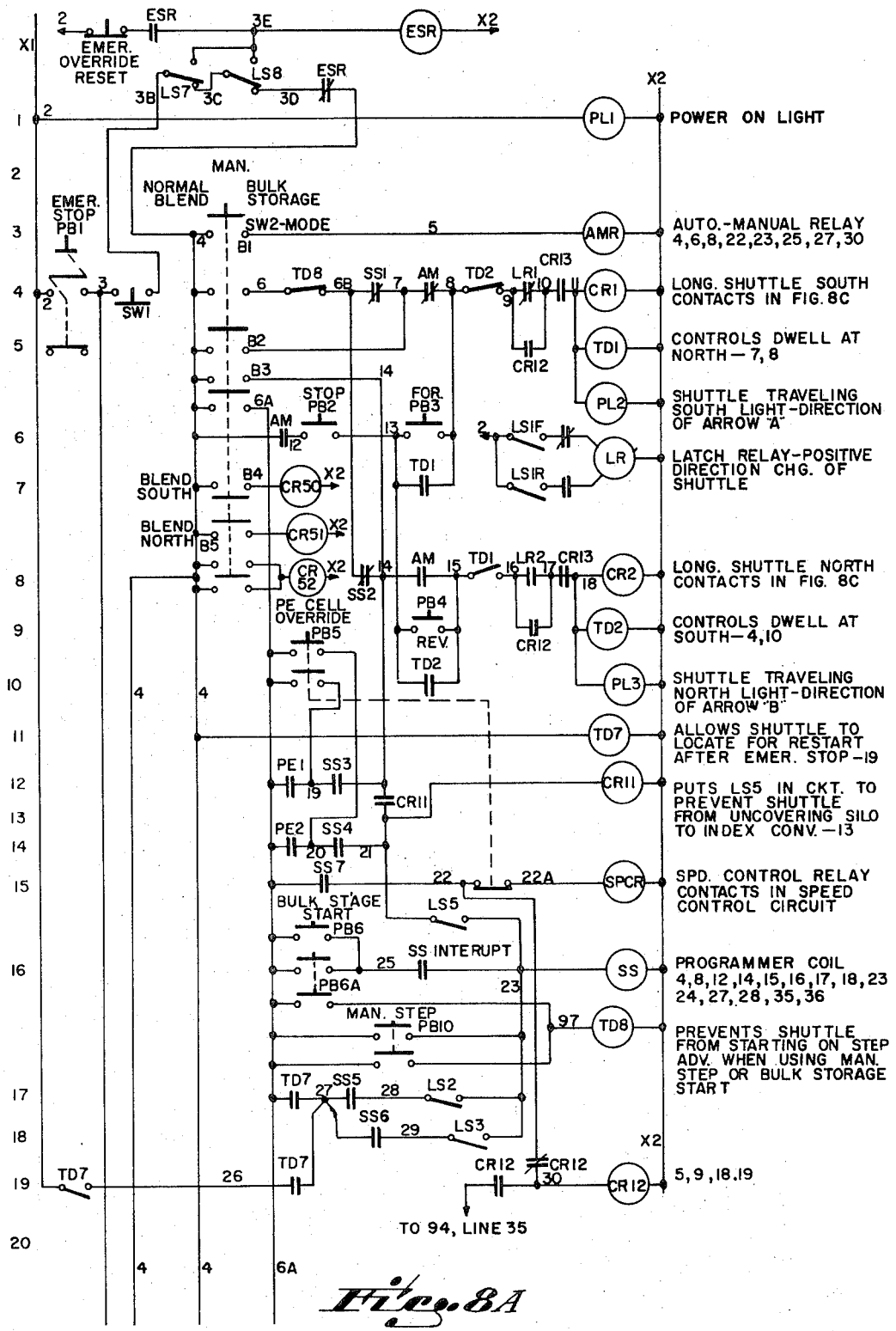

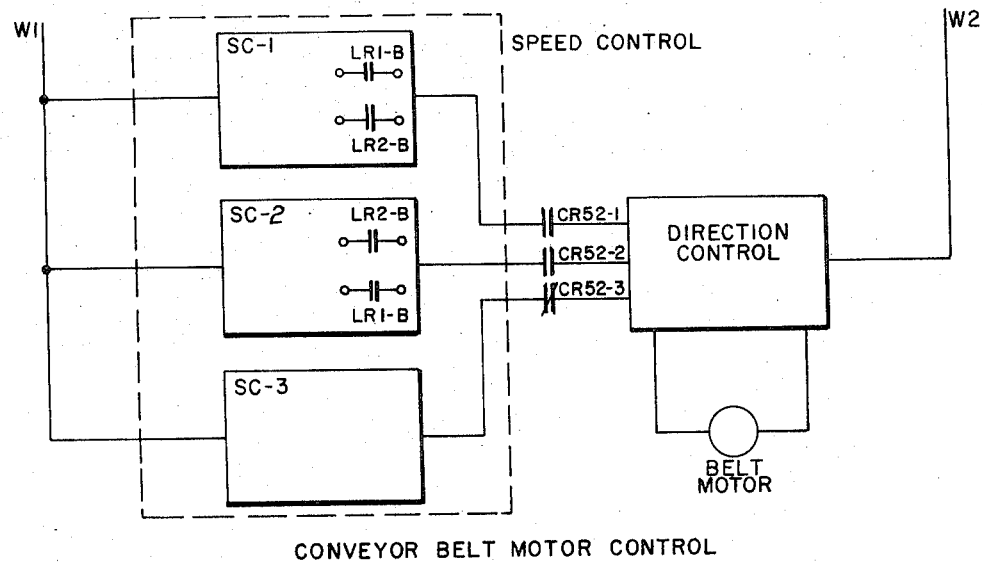
CONVEYOR BELT MOTOR CONTROL
Fig. 8E
|  |  | 1 | 2 | 3 | 4 | 5 | 6 | 7 | 8 | 9 | 10 | 11 | 12 |
|---|---|---|---|---|---|---|---|---|---|---|---|---|---|
| SS1 | FWD. SHUTTLE | X |  | X |  | X |  | X |  |  |  |  |  |
| SS2 | REV. SHUTTLE | X |  |  |  |  |  |  |  |  |  |  |  |
| SS3 | PE 1 |  | X |  |  |  | X |  |  |  |  |  |  |
| SS4 | PE 2 |  |  |  | X |  |  |  | X |  |  |  |  |
| SS5 | LS 2 | X |  | X |  | X |  | X |  |  |  |  |  |
| SS6 | LS 3 |  | X |  | X |  | X |  | X |  |  |  |  |
| SS7 | SPEED |  | X |  | X |  | X |  | X |  |  |  |  |
| SS8 | FWD. BELT |  | X | X |  | X | X | X |  |  |  |  |  |
| SS9 | REV. BELT |  |  |  | X |  |  |  | X |  |  |  |  |
| SS10 | BELT DISC. | X |  |  |  |  |  |  |  | X |  |  |  |
| SS11 | BELT DISC. | X |  |  |  |  |  |  |  | X |  |  |  |
| SS12 | LS 6 |  |  |  |  |  |  |  | X |  |  |  |  |
| SS13 | PL 8 | X | X | X | X | X | X | X | X |  |  |  |  |
|  | INT. |  | X | X | X | X | X | X | X | X | X | X | X |
PROGRAMMER SS
Fig. 9                Fig. 10
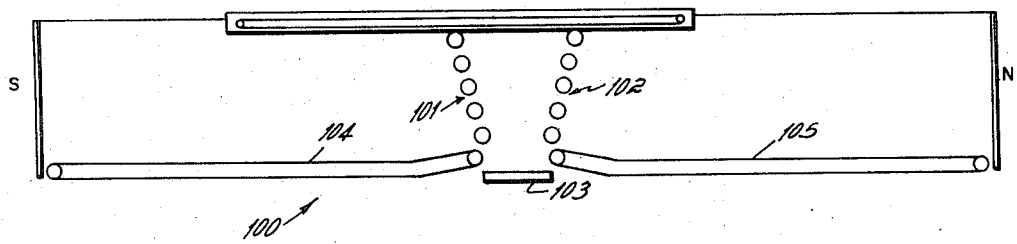

METHOD OF PROCESSING TOBACCO IN A BLEND-BULK SILO

This is a division, of application Ser. No. 159,823, filed July 6, 1971 now U.S. Pat. No. 3,735,881.

The present invention relates to material handling or processing and more particularly to methods for both blending tobacco and storing tobacco in bulk ("bulking").

Broadly, the invention contemplates the charging of tobacco or the like into a silo in a plurality of manners which are selected depending upon the result desired. The method is applicable to the handling of whole leaf tobacco, tip leaf, "strip" tobacco, stems, cut roll stems, cut filler, and other products as well, but in a preferred embodiment is described in its use with cut filler tobacco.

For ultimate use in cigarettes, cigars or other smoking materials, tobacco is generally processed by threshers from its whole leaf form into strips and then into smaller "cut filler" pieces, in which form it may be made into cigarettes or cigars as well known in the art.

Large quantities of this cut filler present handling problems to the processor. In many cases, the tobacco must be stored for some time as part of the curing process before it can be processed into a cigarette or the like.

The ability to store large amounts of the cut filler gives a processor more flexibility in the processing of tobacco since there is a quantity of filler always on hand to be discharged to further processing stations, and since the storage means may be filled by cut tobacco for storing when the processor is not ready to conduct further processing operations on the tobacco.

Another problem confronting the tobacco processor is that of uniformly blending various strains or types of cut filler into a single "blend" of tobacco to be made into cigarettes or other smoking material. Where the cut filler is made up of more than one type of tobacco, the various types must be blended throughout so that the end product is a thorough and extremely uniform mixture of the various types of tobacco used. It may also be necessary to store this blend for a period of time for curing or for providing the processor some flexibility in timing with regard to the sequence of the general processing steps. Particularly, the ability to accept an amount of cut filler from the cutting apparatus and to hold it for a period of time, or to immediately transfer it to apparatus for further processing, is an asset to the processor whether operating with cut filler of the same type or with a "blend" of various types.

Another problem confronting the tobacco processor is that of utilizing the full storage capability of a storage apparatus. A typical storage apparatus may include a rectangularly shaped, longitudinal bin or silo provided with a car located over it and apparatus for feeding tobacco onto the car and thence into the silo. The problems of utilizing the full storage capacity of such a silo arise both in the bulking of tobacco as well as in silos utilized for blending tobacco. In a blending apparatus, a portion of a storage bin or silo is charged by a belt moving in one direction on the shuttle which reciprocates back and forth above the bin. The layers deposited in the bin tend to be uneven in thickness, because the apparent belt speed varies as the shuttle changes direction. The speed of the belt is constant, but when the shuttle runs in the same direction as the belt, its speed adds to that of the belt, and when the conveyor runs in the opposite direction, its speed is subtracted from that of the belt. Even if the tobacco is fed onto the belt at a constant discharge rate, its layer thickness on the belt onto which it is fed varies as the shuttle reverses direction and this results in an uneven fill of the storage bin. As a result, when some areas of the bin are filled, the other areas still have an available space for storage. In some cases the profile of the fill may resemble a sloping curve or hill with a low point or low tobacco depth at one end of the fill and a high point or high tobacco depth at the other end.

Furthermore, where the shuttle and belt are fed by an additional shuttle and belt and where this additional shuttle reciprocates and receives tobacco at a constant rate, the profile of the tobacco deposited onto the main shuttle belt is also uneven in cross-section.

The result of these two feeding problems is seen in the storage bin as an extremely uneven fill profile. The result of the combined problems is a failure to utilize the full available storage volume in a storage bin or silo.

In a bulking apparatus and in a different blending apparatus where, for instance, the belt is reversed as the shuttle changes direction so as to blend tobacco over the length of the whole silo, the apparent belt speed is a constant and the uneven fill problem does not occur with respect to the first shuttle and belt. If, however, the additional second shuttle and belt are utilized to feed tobacco onto the first belt, in these operations the problem arises with respect to this feeding step and the result is an uneven fill and wasted storage space.

Space may also be wasted where only a small volume of the tobacco is to be blended or bulk stored and thus a whole silo is only partially filled, leaving a large amount of unused area.

An even more serious problem is the duplication of equipment required for storing tobacco of a single type and for "blending" tobacco when the final product is to include a mixture or blend of various types of tobacco. In many cases, the processor finds it desirable to process a "run" of tobacco of a single type for a period of time and then to process a "run" of tobacco of a blend of various types. When a processor handles these two different products he must provide equipment for bulking tobacco of a single type and additional equipment for blending tobacco of various types. This duplication results in the nonuse of one type of equipment while the other type is operating, an expensive practice since the nonproducing machinery is not only idle but also requires additional space.

It is desirable to control a storage silo in an automatic manner in several blending modes, in a bulk storage mode, and in a manual manner as well. Such a concept allows a processor to continually use the full volume capacity of his silo equipment. While an automatic control of the various operations frees an operator to other duties, the ability to manually control elements of the apparatus allows one to take full advantage of the storage capabilities of the silo. For instance, an operator may manually control various selected elements to fill voids or spaces in the silo not completely filled by the apparatus when operating in an automatic manner, or to skip desired steps in the automatic program.

The invention contemplates methods useful both for the bulking or storing of tobacco or the like and for blending it. Also contemplated are methods for filling a selected portion of the silo with a particular type of fill and for filling the remaining portion with another type of fill. The invention further contemplates methods for insuring a full fill of the storage facility when either "bulking" or "blending," and methods for discharging tobacco therefrom on a first in, first out basis or on a last in, first out basis.

Briefly, the invention includes a silo which is used both for blending and bulking. This silo is provided with a discharging means including a floor or apron, which in a preferred embodiment comprises a slat type conveyor or apron as disclosed in Wilding U.S. Pat. No. 3,259,228. Other suitable conveyor means could be utilized.

The discharge means further includes other means provided at one end of the silo, including a discharge receiving cross-conveyor for receiving tobacco from the silo and for transporting it to further processing apparatus, and mixing or doffer means with rotating elements for gently separating, blending and discharging a cross-section of the tobacco at a uniform controlled rate as it is moved toward the discharge conveyor.

A main shuttle car is mounted on guideways or rails above the silo for reciprocal movements in first and second directions along the silo's length. A conveyor is mounted and carried on the shuttle car for receiving tobacco and for depositing it into the silo. This conveyor moves with the shuttle as the latter moves and also moves in the first and second directions with respect to the shuttle.

A cross-feed shuttle is provided above the main shuttle car, and it too is provided with a conveyor which receives tobacco from a chute or other feeding means and deposits it onto the conveyor of the main shuttle car as the latter moves.

These elements are controlled to operate in a selected manner to bulk store cut filler or to blend various types of cut filler over the full length of the silo or a portion thereof.

In bulking, cut filler tobacco is fed onto the cross-shuttle and then onto the belt of the main shuttle. The main shuttle is controlled to move from one point above the silo to another while its conveyor, moving in a first direction, continuously deposits tobacco into the silo. When the tobacco reaches a desired level at one point the shuttle is moved toward the unfilled area. The first portion of the silo (typically half its length) so traversed is thus filled by the continuous conveyor feeding and the motion of the shuttle. The shuttle is then returned to its starting position and again moves in the same direction while the direction of movement of the conveyor on the shuttle is reversed so as to run in a second direction for filling the remaining half of the silo.

Several blending modes of operation are provided. In a normal blend mode, the blend is deposited over the total length of the silo; in two other blend modes the blend is deposited in only a selected portion of the silo. For blending in a normal manner tobacco of various types, the tobacco is fed to the main shuttle in the same manner as it is in a bulking operation; however, the shuttle's motion is reciprocal, back and forth over the length of the silo, and its rate of movement is so that it deposits a relatively thin layer of tobacco into the silo beneath it in comparison to the bulking operation. The silo is filled by successive reciprocal passes of the shuttle depositing successive thin layers of tobacco therein. The conveyor reverses its direction as the shuttle changes direction and speed, depositing a plurality of layers over the whole length of the silo. The result is a "fill" of thin layers and thus a "blend" of tobacco. In the alternate blending modes, "blend south" and "blend north," the conveyor's direction is not reversed but is moved in the direction toward the portion of the silo that is to be filled while the shuttle reciprocates from one position to the other. This deposits a plurality of layers into only one portion of the silo.

The apparatus may be controlled either to discharge first the first tobacco received into the silo, or to discharge first the last tobacco received into the silo. This is accomplished by selecting appropriate directional movements of the main shuttle and conveyor, filling the silo and then discharging the tobacco in a normal manner. For instance, if the tobacco first put into the silo is to be discharged first, the bulking is started at the discharge end of the silo. If the last tobacco placed into the silo is to be discharged first, the bulking is started at the remote end of the silo.

In a refinement, the speed of the main shuttle conveyor is controlled and charged in order to insure a full, even fill of the silos during operation in a "blend south" or "blend north" mode. The speed of the conveyor is increased or decreased depending on the direction of shuttle movement, so that the resultant speed of the conveyor is a constant with respect to an infeed point. The speed compensating concept may be utilized in conjunction with the cross-shuttle conveyor as well as the main shuttle conveyor so as to insure an even layer of tobacco on the main shuttle conveyor as well as even layers within the silo. This concept may be utilized in connection with the cross-shuttle feed whether the apparatus is operating in a bulking mode or in the latter blending modes.

It is thus a primary object of the invention to provide methods for processing tobacco including the bulking and blending thereof.

It is a further object of the invention to provide methods for fully filling a tobacco storage silo.

A further object of the invention is to provide methods for discharging first the first tobacco placed into a silo or for discharging first the last tobacco placed into a silo.

It is yet a further object of the invention to provide methods for storing tobacco in bulk in a silo and for discharging tobacco while the silo is filling.

A further object of our invention is to provide methods for automatically controlling the blending or bulk storing of tobacco or the like in a single apparatus.

It is a further object of our invention to provide a method for storing and blending tobacco which method minimizes manual handling of tobacco and thereby reduces labor.

These and other objects and advantages will become apparent from the following detailed description and drawings, in which:

FIG. 1 is a general view showing a bank of silos and the longitudinal shuttles in cross-section with a cross-shuttle positioned to feed silo S5, FIG. 2 is a view taken along lines 2—2 of FIG. 1 and shows a single silo and longitudinal shuttle with the cross-shuttle shown in cross-section, FIG. 3 is a view taken along lines 3—3 of FIG. 2 and shows the general details of the drive for the longitudinal shuttle, FIG. 4 is a view showing three types of suitable doffers in detail, FIG. 5A is a diagrammatic view of the first portion of a bulking or storing operation, FIG. 5B is a diagrammatic view of the second portion of a bulking or storing operation, FIG. 6A is a diagrammatic view of the first portion of a normal blending operation, FIG. 6B is a diagrammatic view of the second portion of a normal blending operation, FIG. 7A is a diagrammatic view of a blending operation in a first portion of the silo, FIG. 7B is a diagrammatic view of a blending operation in a second portion of the silo, FIGS. 8A–8B are circuit diagrams showing the control circuit of the invention, FIG. 8C is a circuit diagram showing the shuttle motor control circuit including an SCR, FIG. 8D is a circuit diagram showing the slat conveyor motor control circuit including an SCR, FIG. 8E is a circuit diagram showing the speed control for varying the conveyor belt speed, FIG. 9 is a print chart showing diagrammatically the various contact positions for the various steps in the bulking program, and FIG. 10 is a view showing an alternate embodiment of a silo utilizing a central discharge.

DETAILED DESCRIPTION OF A PREFERRED EMBODIMENT

Figure 8B:
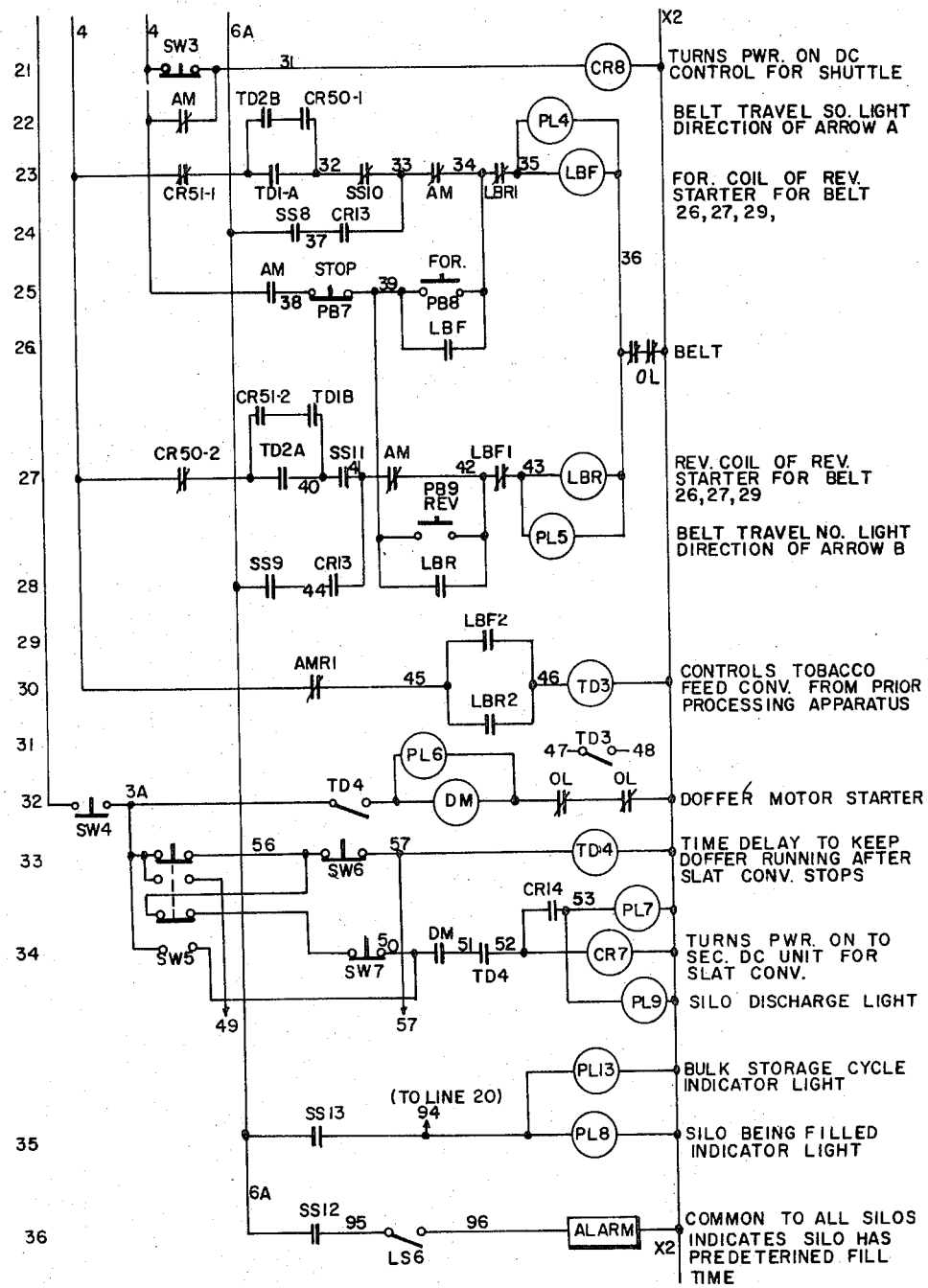

Referring to the drawings in detail, FIGS. 1–4 show the details of a silo which embodies the features of my invention. While FIG. 1 shows diagrammatically a bank of silos, S1–S8, the following description will be of only a singular silo, it being understood that each silo in the bank is similar to the one described. For descriptive purposes the term "silo" will be utilized to describe a receiving or storage silo or bin shown generally at 21 which corresponds to silo S5 of FIG. 1. While my invention may be utilized for various products of all kinds it is here described in connection with its preferred use in tobacco processing or handling. The silo itself includes two side walls 22 and 23 and end walls 24 and 25 located at either end, the silo being generally rectangular in configuration. The silo has a discharge end 26, an opposite end 27, and central portion 28. The area of the silo between discharge end 26 and central portion 28 is designated by the term "south" and the area between central portion 28 and end 27 is designated by the term "north."

Above the silo bin 21 is mounted a main or longitudinal shuttle car 29 which may be equal in length to approximately one-half that of the silo. The car has south end 30 and north end 31 and is provided with flanged wheels 32 which support the car 29 on rails 33 and 34 located along the top of the sides 22 and 23 of the silo. Either end of the shuttle car may discharge tobacco depending upon the direction of the belt's movement.

Alternately, the silo may be approximately the same length as the shuttle and the shuttle mounted to move over rails extending from one or both ends of the silo and provided with hangers or other supports.

I have found it desirable to provide a coating 35 on the wheel portion which contacts the rail for the purpose of attaining quiet, smooth operation. A coating of polyurethane "ALATHANE" about three-eighths inch thick has proven suitable.

In the preferred embodiment it will be noted that the length of the shuttle car 29 is generally about one-half that of the silo 21. The car 29 is mounted on wheels 32 for reciprocal movement so that it can traverse the length of the silo. To this end the car 29 is provided with a rack 36 which extends along the length thereof. A motor driven gear 37 engages the rack and when rotated through a drive shaft serves to drive the rack 36 and thus the car 29 in one or the other longitudinal directions as indicated by the directional indicating arrows A and B.

A longitudinal or main shuttle belt conveyor 38 is provided on the car 29 and may be driven in either direction A or B similarly to that of a common belt conveyor as well known in the art. A driving means 39 includes a motor mounted in the shuttle so as to drive the belt 38. The function of this belt and shuttle is to directly fill or charge the silo in a manner as will be described.

An index or cross-shuttle car 40 is positioned above the main shuttle car 29 and belt 38 and perpendicular thereto. It, too, may be mounted for reciprocal movement in any known manner and may be driven so that its ends 41 reciprocally traverse the width of the main shuttle belt 38. The cross-shuttle car 40 is provided with a cross-shuttle belt 42 which is mounted for translational movement on the cross-shuttle car 40 in a manner well known in the art. This shuttle and belt may be driven in a manner similar to the main shuttle and belt. While end 41 functions as the discharge end of the cross-shuttle, the shuttle may be moved to feed other silos in a bank with its other end acting as the discharge end.

A tobacco feeding means or chute 45 is provided in a position so as to discharge tobacco onto the cross-shuttle belt 42. Alternatively, the tobacco may be deposited directly onto the main shuttle belt. While the apparatus is capable of handling tobacco in its whole leaf form, its "strip" form, or in its cut roll form, it is disclosed in use with tobacco in its cut filler form. Chute 45 thus deposits cut filler, received from a previous cutting or processing apparatus, onto cross-shuttle belt 42. As shown in FIG. 1, the cross-shuttle may be operable to feed the main shuttles of the silos S1–S8 in the bank; however, it will be described in its operation in connection with a single silo such as S5.

Referring to FIG. 2, silo 21 is provided with tobacco discharging means including a slat type conveyor floor or apron 50. The slat type apron disclosed in my previous U.S. Pat. No. 3,259,228 may be suitably used. Included in the discharging means are separating and blending means such as the spiral-like doffers 51–55. These means operate to gently separate and discharge tobacco and may be any of a variety of known configurations. FIG. 4 shows three types of doffers including a paddle type doffer 90, a pin type doffer 91, and a spiral type doffer 92. Doffer 92 includes spiral-like members 48 mounted about axles 49 as shown for rotary movement. Other types of floors or doffers may be utilized as well known in the art. It will be noted that the slat floor is inclined at the discharge end of the silo in order to provide space for a suitable take-away conveyor 56.

The floor 50 is movable toward the discharge end 26 of the silo 21. The doffers 51–55 are also provided at the discharge end 26 so as to separate a cross-section of the tobacco as it is moved into the doffers by virtue of the motion of floor 50. It is to be noted that the lowermost doffer 51 is located outside of the next doffer 52 and that doffer outside of doffer 53. Thus, as the uppermost doffer separates an upper portion of a "fill" of tobacco, that portion tends to fall through the next lower doffer and so on, thereby mixing with lower portions of the "fill" of tobacco. Thus the cross-section of tobacco engaged by the doffers is an inclined cross-section provided to insure static stability of the tobacco. The inclined cross-section is to create a mass of tobacco that is stable and will not collapse through the doffers when the apron advance is stopped for any reason. This feature aids in the blending of the tobacco as will be discussed. The term "fill" is utilized to describe that portion of tobacco which has been deposited into the silo. The doffers and slat conveyor are driven through respective drives 57 and 58 which include driving motors and appropriate connections as known in the art.

Tobacco discharged from the cross-sectional fill gently falls or is scattered onto a discharge conveyor 56 or any other take-away means which moves the tobacco away from the silo to further processing apparatus.

The various described elements are operational to accomplish a plurality of modes of operation, i.e., three "blending" modes wherein a plurality of types of tobacco are deposited into selected portions of the silo in layers, thereby causing them to blend together, a "bulking" mode wherein tobacco of the generally same type is bulked or stored in the silo, and a "manual" mode whereby the longitudinal shuttle car 29 and belt 38 are individually controlled by an operator to fill selected areas of the silo.

In a normal blending mode, tobacco is blended over the whole length of the silo. Tobacco is fed onto cross-shuttle belt 42 through chute 45. Belt 42 is moved toward discharge end 41 of the cross-shuttle 40 so as to deposit tobacco on belt 58 of longitudinal shuttle car 29. Cross-shuttle car 40 reciprocates over main shuttle belt 38 so that discharge end 41 of the cross-shuttle traverses the width of belt 39.

In one example of the normal blending process, the shuttle car 29 may be positioned with its end 31 near the end 27 of silo 21 as shown in diagrammatic FIG. 6A. As the tobacco is fed onto belt 38 by cross-shuttle 40, belt 38 is driven to move in the direction of arrow "A." Concurrently, the main shuttle car 29 is driven through its rack and gear drive in t direction of arrow "A." When the end 30 of shuttle car 29 reaches the discharge end 26 of silo 21, the other end 31 of the shuttle is positioned over a central portion 28 of the silo 21. A layer of tobacco is thus deposited in the south portion of the silo. At this time the shuttle is reversed to travel in the direction of arrow B and the belt 38 is also reversed to move in the direction of arrow B so as to deposit a layer of tobacco into the silo in the area north of the silo as depicted in FIG. 6B. When the shuttle car 29 reaches end 27 of silo 21, it again reverses its direction, having deposited a layer of tobacco into the silo. Successive passes of the shuttle 29 are made until the silo contains a fill of a plurality of layers of tobacco over its full length.

For depositing a blend of tobacco in a selected portion such as in only the south portion or in only the north portion, the belt is continued in the same direction as only the shuttle reverses. Diagrammatic FIG. 7A illustrates the blend south mode where the shuttle deposits layers of tobacco into the silo only into its south portion. In this step, the shuttle is reciprocated while the belt travels only in the A direction. This leaves the north portion of the silo free to accept blended or bulked tobacco at a later time. Diagrammatic FIG. 7B illustrates the blend north mode where the shuttle deposits tobacco only into the north portion of the silo. In this step, the shuttle is reciprocated while the belt travels only in the B direction.

Of course, for any blending mode or step, a more uniform blend is attained when thinner layers of tobacco are deposited into the silo. While various tobacco feeding rates and shuttle and belt speeds may be combined to attain desired results, I have attained a suitable blend by feeding tobacco into the apparatus at the approximate rate of 15,000 to 16,000 pounds per hour, by reciprocating the shuttle 29 at about 100 feet per minute and by moving the belt 38 at about 100 feet per minute. This combination for a silo of typical size results in a layer of cut filler weighing approximately 3 pounds per lineal foot of silo length. Any combination of speeds or feed rates may be used. In this manner, a plurality of types of tobacco may be fed into the apparatus in a non-uniform manner and may be uniformly blended by virtue of the depositing of layers of the mixture into the silo whether over the whole length of the silo or in one portion thereof.

The silo discharge means of the silo further aids in the blending of the tobacco. The doffers 51–55 mix the various layers as a continuous cross-section of the fill is fed into them when the slat conveyor floor 50 is activated to discharge the silo. This mixing action is attained by the inclined mounting configuration of the doffers 51–55 as previously described. The discharged tobacco thus comprises a uniform blend of the plurality of the types of tobacco used.

In a "bulking" mode or step, cut filler is fed to belt 38 of main shuttle 29 in the same manner as in the described blending mode. In this mode, blending is unnecessary as only a single type of tobacco is to be placed into the silo. The bulking mode is depicted in diagrammatic FIGS. 5A and 5B. The shuttle car is initially positioned as in FIG. 5A with its end 30 near end 26 of the silo and the belt 38 is driven in the direction of arrow A. The shuttle is not reciprocated but remains stationary while belt 38 discharges tobacco into the silo. When the tobacco reaches a desired height, the shuttle is incrementally moved in the direction of arrow B and the belt 38 continues to discharge tobacco into the silo until the area beneath the end 30 of shuttle 29 is filled. The shuttle is then again incrementally moved in the direction of arrow B to the adjacent unfilled area and so on until the south portion of the silo from end 26 to central portion 28 is filled. At this time the shuttle is returned to the south end of the silo so that its end 31 is adjacent central portion 28 of the silo as in FIG. 5B. The belt 38 is reversed to travel in the B direction and the filling of the last half of the silo continues with the shuttle 29 moving incrementally in the direction of arrow B to the next unfilled area until the north portion of the silo extending from central portion 28 to end 27 is filled. It will be noted that since tobacco is deposited into the silo beginning at its discharge end 26, the first tobacco deposited is the first to be discharged. Alternatively, the shuttle may be initially positioned near end 27 of the silo to begin depositing at that end so that the last tobacco to be deposited (near silo end 26) will be the first to be discharged, should that process be desired. Also, the shuttle may be controlled to store tobacco in a portion of each end so that four or more types may be stored.

The shuttle may be controlled to deposit an "overlay" or second layer on the first after the silo is filled. This aids in filling void spots and fills up areas where the first tobacco deposited has settled. This overlay is deposited in the same manner as the first deposit, beginning at end 26 and being deposited over the whole length of the silo, the shuttle moving incrementally to next adjacent areas to be filled. This overlay fills those areas missed in the first fill as well as adds to areas from which deposited tobacco has settled. It is, of course, obvious from the description herein, that this overlay can be applied to a "fill" of tobacco in the silo, regardless of the manner in which the silo was filled.

It is to be understood that, while the shuttle 29 is moved in successive incremental steps when bulking tobacco, it could be moved continuously and the longitudinal shuttle belt rate and rate of tobacco feed onto this belt could be adjusted accordingly. Thus the term "incrementally" may be defined to include intermittent movement, progressive movement or continuous but relatively slow movement as opposed to its speed when operating in a blending mode.

In a "manual" mode or step, the main shuttle 29 and belt 38 is controlled independently by the processor. The shuttle may be moved to any desired location along the silo and the belt 38 may be activated to move in either direction. This manual mode of operation thus provides the ability to fill void or low spaces within the silo or to position the shuttle and belt in a desired manner prior to beginning an operation. It may also be utilized to inspect the movement of the shuttle and belt for inspection purposes. This manual operation also allows a processor to bulk fill the silo while the shuttle is stationary. This is accomplished by operating the belt, and by simultaneously moving the slat conveyor toward the discharge end of the silo. If a full fill is required, the shuttle is located toward the north end of the silo and the belt operated in the direction of arrow B. If only one-half is desired, the belt may be operated in the direction of arrow A. Alternately, the shuttle may be located over the south portion of the silo and the belt operated in the direction of arrow B. This feature is advantageous since it enables the processor to continue a bulking operation should the automatic control programmer or circuitry malfunction.

In a refinement of the blending steps, the speed of the main shuttle belt 38 is controlled, when operating in a Blend South or Blend North mode, to insure a level fill of tobacco in the silo. It can be observed that, as the end 30 of the shuttle 29 reciprocates between end 26 and central portion 28 of the silo, while the belt 38 is maintained at a generally constant direction and speed; the resultant speed of the belt with regard to a relatively stationary infeed point (the discharge end 41 of the cross-shuttle) is a variable. Thus, when the shuttle moves in the direction of arrow A and the belt 38 is moving in the same direction, the belt's speed in relationship to the infeed point is greater than when the shuttle and belt move in the opposite direction of arrow B. Assuming that tobacco is fed onto belt 38 at a constant rate, it is thus obvious that, as the speed of the belt varies with respect to the infeed point, the tobacco layers vary in thickness. When the belt then deposits the tobacco into the silo, the profile of the tobacco fills tends to unevenness and may eventually resemble a curve from one end of the fill to the other. This is caused since the thicker layers fill up certain areas before those areas receiving the thinner layers become filled. This results in unused available areas when others are full and the process of depositing the tobacco must be stopped to avoid overflow of the filled areas.

To overcome this problem, the speed of the belt 38 is compensated such that its resultant speed with respect to the tobacco infeed point is a constant. Thus, while the shuttle moves in the direction of arrow A, the belt is driven at one speed and, when the shuttle moves in the direction of arrow B, the speed of the belt is increased such that its resultant speed is a constant.

In one particular example, the shuttle speed in both directions may be approximately 100 feet per minute and the speed of the belt approximately 50 feet per minute when the shuttle moves in the direction of arrow A. The resultant belt speed is thus 150 feet per minute with respect to the infeed point. When the shuttle moves in the direction of arrow B, the speed of the belt 38 is increased to 250 feet per minute such that the resultant belt speed is 150 feet per minute with respect to the infeed point.

This concept can also be utilized in connection with the operation of the cross-shuttle 40 and its belt 42, when the silo is controlled to either blend or to bulk. The same problem exists here except the result is uneven layers of tobacco deposited on the main shuttle belt 38, and thus into the silo. If no belt speed compensation is performed on either belt, it can be appreciated that the tobacco fill profile would be very uneven. To eliminate this, the belt speed of both shuttle belts is compensated as the shuttles change direction so that the resultant speed of each belt is a constant with regard to its respective infeed point and the layers deposited onto each belt and into the silo are thus fairly level. This insures a very level tobacco fill profile which fully utilizes the available area of the silo. It is to be noted that the slat apron and doffers may be operated to discharge tobacco while the silo is filling in a bulking mode. Movement of the apron and doffers in no way interferes with the operation of the longitudinal shuttle.

FIG. 10 shows an alternative silo 100 with a central discharge. This silo includes a central discharge area with two sets of inclined doffers 101 and 102 as shown. A discharge conveyor 103 is shown to receive tobacco discharged through the doffers. The silo has a North and South portion, each having a slat conveyor 104 and 105 respectively, each of which can be operated toward the central discharge area independently of the other. While this silo may be operated in the same manner as the one previously described, it provides a silo wherein the processor may utilize a central feed in addition to a central discharge. This one portion of the silo may be discharged concurrently with a blending operation in the other portion by merely operating the slat conveyor and its associated doffers in one portion of the silo while filling the other portion.

As previously described, the longitudinal shuttle, the belt of the longitudinal shuttle, the slat apron of the silo, and the doffers are all driven by respective motors which are controlled to move the various elements in a desired manner. While any circuitry may be utilized which is suitable for controlling the motors to provide the desired movements of the elements of the silo without departing from the scope of the invention, an example of one circuit which has been found suitable is hereinafter described. The details of the circuits shown in FIGS. 8A to 8D will become apparent to one of ordinary skill in the art from an inspection of the figures themselves and the following description of the operations of the circuit.

The motors of the longitudinal shuttle belt, the doffers, the slat conveyor and the longitudinal shuttle drives all receive their primary power through an ordinary connection to a power source as well known in the art and the control circuitry shown is operable to control the direction or speed of the motor as will be described. The shuttle motor control circuit shown in FIG. 8C and the slat motor control circuit shown in FIG. 8D receives power through wires L1 and L2 from the power source. The belt motor control receives power from a power source through wires W1 and W2. The control circuit receives power through a transformer which applies an appropriate voltage across wire X1 and wire X2 of line 1 of the circuit diagram. A mode of operation switch is shown in lines 3 through 5 and 7 and 8 of FIG. 8A. This switch may be positioned to select the mode of operation of the silo including a normal blending mode, a blend north mode, a blend south mode, a bulking mode, and a manual mode. The operation of the circuitry will be described first as if the mode of operation switch were positioned to control the silo in a normal blending mode.

In this position the switch connects a hot wire 4 to wire 6 through the switch's contacts B2 and to wire 14 through the switch contacts B3. The hot wire 4 is also connected in line 21 to relay CR8 by the normally closed automatic manual relay contacts AM in line 22. The automatic manual relay is in line 5 of the diagram and is energized when a manual mode is selected to open and close its various contacts so as to put the various drive motors in control of independent switches as will be later described. The contacts of relay CR8 in line 21 are located in line 37 (FIG. 8C) and are closed to apply electrical power through wires 61 and 63 from the power source to the longitudinal shuttle motor control which may include an SCR in a manner well known in the art. As the contacts of CR8 close, relay CR13 also is energized to close its contacts in lines 4 and 8 of the circuit.

To control the reversing action of the longitudinal shuttle, a latch relay (LR) in lines 6 and 7 connects through limit switch LS1F and LS1R to hot wire 2. Limit switch LS1F is positioned so as to be closed by the shuttle when the end 30 of the shuttle reaches the end of its run in the direction of arrow A and LS1R is positioned so as to be closed when the end 31 of the shuttle reaches the end of its run in the direction of arrow B. In the latch relay shown in lines 6 and 7 of the circuit there are two internal contacts, one of which is normally closed and the other normally opened. The relay has two other contacts, LR1 which is normally closed in line 4 of the circuit, and LR2 which is normally opened in line 8 of the circuit. When limit switch LS1F is closed by virture of the shuttle's movement in the direction of arrow A, the hot wire 2 energizes the latch relay through the normally closed contact which opens contact LR1 in line 4 and closes contact LR2 in line 8. It also reverses the two internal contacts of the latch relay such that the one in line 6 is opened and the one in line 7 is closed. When the shuttle reaches the end 27 of the silo, it closes limit switch LS1R, thereby unlatching or rather applying voltage again to the latch relay coil and opening LR2 in line 8 and closing LR1 in line 4, and also again reversing the internal contacts in lines 6 and 7.

The latching and unlatching of the LR relay by the two limit switches LS1F and LS1R reverses the shuttle by alternating the hot circuit from line 4 (travel in the direction of arrow A) to line 8 (travel in the direction of arrow B). When the limit switch LS1F is opened (before being closed by the shuttle moving in the A direction) or in position for operating, the latch relay contact LR1 in line 4 is closed and the mode of operation switch has connected the hot wire 4 to wire 7. The automatic manual relay contact in line 4 is normally closed and the timer contact TD2 is closed, thereby conducting the current into the contact of CR13 in line 4. This contact has been closed by virtue of the application of power to the motor control circuit of the longitudinal shuttle and thence to relay CR13 in line 37 of the diagram as previously indicated. This closed contact in line 4 completes the circuit to energize relay CR1, timer TD1, and the shuttle directional indicating light PL2. This light indicates that the shuttle is traveling in the direction shown by arrow A. The relay CR1, when energized, closes its normally opened contacts and opens its normally closed contacts in the armature circuit of the longitudinal shuttle motor control. The opening of the normally closed contacts removes the dynamic brake circuit from the armature of the longitudinal shuttle motor and the closing of the normally opened contacts makes a circuit from A1 and A2 of the motor control circuit unit to the armature to cause the motor to rotate to move the shuttle in the A direction.

When energized, the timer TD1 opens its instantaneous contacts in the motor control circuit through the Jones plug, which is connected to the motor control internally as well known in the art. The terminals 6 and 7 of the motor control should be shorted out when the motor is not running and the normally closed contact of TD1 connected in series with the normally closed contact TD2 shorts these terminals together when the motor is not running.

The contact TD1 in line 8 opens and remains open until TD1 is de-energized. Then the contact closes after a set time to cause the longitudinal shuttle to begin travel in the B direction. This time delay allows a dwell period during which the shuttle stops its motion before reversing after reaching the end 27 of the silo. This dwell time allows the armature of the shuttle motor to stop and the dynamic brake to dispense all the voltage generated by the armature by the coasting motion of the shuttle, before reversing and running in the other direction.

The instantaneous contact of TD1-A in line 23 closes and conducts current from wire 4 to wire 32, through the normally closed contact SS10 and through the normally closed AM contact to wire 34. From here, current is conducted through the normally closed contact LBR-1 of the reverse coil LBR of the belt motor starter, through the directional indicating light PL4 and to the forward coil LBF of the belt motor starter, thereby starting the belt to run in the direction of arrow A. The energizing of the belt motor in this direction opens the normally closed contact LBF–1 in line 27 to prevent reversing the belt, i.e., to prevent running the belt in the direction of arrow B when the shuttle is moving in the direction of arrow A. Also, the normally opened contact LBF-2 in line 29 is closed to energize timer TD3 through a normally closed AMR1 contact in line 30. This contact is connected to the apparatus which feeds tobacco to the silo and the shuttles from a previous processing step and allows the apparatus to continue its operation during reversal of the shuttle car.

It can be readily observed that, due to the operation of the timer contacts TD1–A in line 23 and TD2–A in line 27, the belt will always start when one or the other of the contacts is timed out. Therefore, the contacts LBF–2 in line 29 and LBR–2 in line 31 which energize the timer TD3 are actually timed along with timers TD1 and TD2 and thus the tobacco feeding apparatus is kept running during the reversal time of the shuttle.

By way of further explanation, when the shuttle is traveling in the direction of arrow A, limit switch LS1F is closed, thereby energizing the LR relay to close the contact LR2 in line 8. After the timer runs on timer TD1, the contact TD1 in line 8 closes and the shuttle runs in the direction of arrow B. This is due to current running from wire 4 through contacts B3 of the mode switch to wire 14. Wire 14 conducts currents through the normally closed AM contact in line 8 to the TD1 timer contact which is re-closed to conduct the current through contact LR2 which in turn is closed. When the limit switch LS1F actuated the latching relay, the circuit continued through the contact CR13 to energize relay CR2, timer TD2, and the directional indicating light PL3. This light indicates movement of the shuttle in the direction of arrow B. The contacts of relay CR2 release the brake circuit in the shuttle drive motor control as do the contacts of CR1 when the shuttle is running in the direction of arrow A. The contacts of CR2 also reverse the armature contacts of the shuttle motor to the motor control circuit. This reversing causes the armature to run in the opposite rotation and to drive the shuttle in the direction of arrow B.

The energization of the timer TD2 causes this timer to act exactly the same as timer TD1. The TD2–A contact in line 27 closes to allow the belt to run in a reverse direction or in the direction of arrow B. Here the reverse coil LBR opens the normally closed contact LBR–1 in the forward circuit of line 23 and closes the normally opened contact LBR–2 in the TD3 circuit of line 30. Thus the timer TD3 is always in the circuit regardless of the direction of the shuttle's movement.

It can be appreciated that the reversal of the shuttle car depends on the operation of limit switches LS1F and LS1R working the coil of the latch relay to cause the reversal of its contacts LR1 and LR2 in line 4 and line 8 of the circuit.

It will be noted that, under these conditions, the shuttle is operable to blend tobacco into the full length of the silo. When the shuttle travels in the direction of arrow A, the belt travels in the same direction, and when the shuttle reaches end 26 of the silo, the belt is reversed and the shuttle travels in the direction of arrow B so as to deposit a layer in the portion of the silo between central portion 28 and end 27. The silo is thus filled by successive passes of the shuttle over the silo's length with the belt changing direction when the shuttle changes direction, the belt being controlled by the circuit shown in lines 23 through 30.

In order to operate the silo so as to deposit a plurality of layers in only one portion of the silo, the mode selecting switch is provided with two additional positions for blending tobacco into the portion between the discharge end 26 and central portion 28 or for blending tobacco in the portion extending between the central portion 28 of the silo and end 27. This portion of the mode selecting switch is shown schematically in lines 7 and 8 of the circuit diagram.

For blending tobacco into the area S of the silo between end 26 and central portion 28, the mode selecting switch contacts B4 in line 7 are closed in order to energize relay CR50. Relay CR50 has contacts located at lines 22 and 27 of the circuit diagram. When this relay is energized by the positioning of the selecting switch so as to close its contact B4, the normally closed contact CR502 in line 27 of the circuit diagram is opened and the normally opened contact CR501 in line 22 of the diagram is closed.

It should be noted at this point that, when the selector switch is positioned in either its blend south or its blend north position, it also closes the contacts B2 and B3 such that current is conducted through line 4 and through line 8 in the normal manner as when the apparatus is operated in its blending mode for filling the whole silo with layers of tobacco. Continuing with the description of the operation, when the selector switch is positioned to its blend south position, the shuttle is operated by the latching relay in lines 4 and 8 of the circuit diagram in its normal reciprocating manner. The belt, however, can only be operated through line 23 of the diagram since the contact CR50–2 in line 27 is opened. It will be noted that an additional set of contacts TD2–B of timer TD2 is provided in parallel with the contacts TD1–A in line 23 of the circuit diagram. Since contact CR50–1 is energized to close when the mode selecting switch is in its Blend South position, it can be seen that current is conducted through line 23 whenever TD1–A or TD2–B is closed and thus the belt continues to run in the same direction regardless of the direction of the shuttle.

When the mode selector switch is positioned in its Blend North position so as to deposit a blend into the N portion of the silo, contact B5 of the selector switch as well as B2 and B3 is closed in order to energize relay CR51 in line 7 of the drawing.

Relay CR51 opens its contact CR51–1 in line 23 of the drawings, and therefore prevents any current from being conducted through line 23 of the circuit diagram to make energization of the belt in direction of arrow A impossible. Energization of relay CR51 also causes the normally opened contact CR51-2 in line 27 of the drawings to close. This has the effect of connecting contacts TD1–B in line 27, and TD2–A in line 27, in parallel such that current can be conducted through line 27 of the drawings when either TD1–B or TD2–A is closed. Thus, the belt may be energized to run in the direction of arrow B regardless of the direction of the shuttle and the contact TD1-B or the contact TD2–A is always closed, depending on the shuttle direction.

When the shuttle is to be operated in the normal blending manner, that is when the belt is controlled to change its direction as the shuttle changes its direction so as to fill the whole silo with a blend of tobacco, the contacts CR51-1 in line 23 and CR50-2 in line 27 are both normally closed, i.e., relay CR50 and CR50 are not energized. Thus, current can be conducted through line 23 or line 27 depending on the position of the TD1-A or TD2-A contacts in both respective lines. It is to be noted that the contact CR50-1 in line 23 and the contact CR51-2 in line 27 are normally opened, thereby removing the timer contacts from the circuit such that, when the shuttle is operating in the direction of arrow A, the belt is controlled to move in the same direction and, when the shuttle is operated in the direction of arrow B so that contact TD2-A in line 27 is closed, the belt is operated to move in the direction of arrow B, the parallel contacts TD1-B and TD2-B being removed from the circuit by virtue of the normally opened contacts CR50-1 and CR51-2.

In order to vary the speed of the belt such that its resultant speed is a constant with respect to the tobacco infeed point, an alternatie belt motor control is provided as shown in FIG. 8E. The motor control circuit includes a speed control which may be of the solid state SCR type or any other speed control suitable for this application well known in the art, and a motor direction control, also well known in the art. For this application, the motor coils LBR and LBF operate control relays utilized in the conveyor belt motor control.

The speed control is shown in dotted lines in FIG. 8E and includes three control units SC-1, SC-2, and SC-3. The units SC-1 and SC-2 are provided since the speed of the belt is varied in each direction of its operation. Unit SC-3 is provided to control the speed of the belt when the silo operates in a Normal Blend mode as will be hereinafter described. The SC-1 and SC-2 units include additional latch relay contacts LR1-B and LR2-B, which, when closed, are indicative of the shuttle's direction of travel and control the respective unit to operate the belt at one of two speeds, respectively. Alternatively, one speed control could be utilized with the two contacts and with additional contacts of relays CR-50 and CR-51 wired in a well known manner to reverse the action of LR1-B and LR2-B when the belt's direction is reversed. Control unit SC-1 controls the belt speed when it travels in a first direction (arrow A) and unit SC-2 controls the speed of the belt when it travels in a second direction (arrow B), for instance as when the silo is operating in a Blend South or Blend North mode, respectively. When the silo is in its Blend South mode, the contacts of relay LBF in line 23 which are located in the direction control are closed by the energization of the relay to cause the motor to operate the conveyor belt in the direction of arrow A. Any suitable circuitry as well known to the art may be utilized in the direction control. When contact LR1-B in SC-1 is closed, the speed control causes the belt to run at one speed and, when LR2-B is closed (indicating shuttle travel in the direction of arrow B), the speed control causes the belt to run at a second speed greater than the first so that its resultant speed with respect to the tobacco infeed point is a constant. Unit SC-2 does not control the motor since its input is opened by virtue of the fact that the contacts of relay LBR in the motor direction control are opened (the relay LBR in line 27 is not energized) and since the input to the direction control is controlled by these contacts (LBF and LBR).

Unit SC-1 is in the circuit in the Blend South mode since contacts LBF are closed.

When the silo is operated in a Blend North mode, the belt runs in the direction of arrow B due to the energization of relay LBR in line 27 and the closing of the LBR contacts in the direction control of FIG. 8E. These contacts may be wired so as to reverse the current to the belt motor or may control the motor's direction through any other circuitry known in the art for this purpose.

Since the LBR contacts are closed and the LBF contacts are opened, unit SC-2 controls the motor's speed. This unit may be the same as SC-1; however, contacts LR1-B and LR2-B are reversed so that when contact LR1-B closed (shuttle moving in direction of arrow A), the motor is energized to run at a faster speed than it runs when contacts LR2-B are closed (shuttle moving in direction of arrow B). Thus the speed of the belt is properly compensated so that its resultant speed is a constant with respect to a tobacco infeed point, regardless of whether the silo is operated in a Blend South or Blend North mode. The use of the two speed units SC-1 and SC-2 enables an operator to separately adjust the speeds of the belt's operation in each of its directions of movement.

Relay CR52 is located at line 8 of the diagram and is connected to the mode selection switch such that it is energized only when the switch is positioned to select operation in the Blend South or Blend North modes. Normally opened contacts CR52-1 and CR52-2 in FIG. 8E are closed by the energization of this relay in order to connect the speed control to the direction control during operation in one of these modes.

Normally closed contacts CR52-3, in FIG. 8E, are opened by energization of relay CR52, but, when the silo is operating in a Normal Blending mode, this contact is closed so that speed unit SC-3 is connected to the motor to control it to run at a constant speed as the shuttle reciprocates. In this Normal Blending mode, the contacts CR52-1 and CR52-2 are opened to remove speed units SC-1 and SC-2 from the circuit.

The ability to fill a selected half of the silo with a blend of tobacco, leaving the other half empty, is very desirable since the other half may be selected to fill in bulk merely by positioning the longitudinal shuttle in its correct position and operating it in a bulk mode or in a manual mode. Thus, the processor may utilize a silo to its full extent where he needs approximately one-half of its volume filled with a blend of tobacco and the other half filled with the same type of tobacco in a bulk manner.

The silo may also be operated in a manual mode with an operator selecting the various functions of the apparatus independently. To accomplish this manual manner of operation, the mode selecting switch is positioned in its manual position so as to connect contacts B1 of the switch and energize the automatic relay circuit. When the mode of operation switch is in this position, the shuttle and its belt are controlled only by the operation of the various switches, as will be described.

The energization of the AMR relay in line 3 of the drawing operates a number of AM contacts. This relay controls an AM contact in line 4 of the diagram which opens to take the normally closed SS1 contact out of the circuit. This contact is one of the contacts associated with a programmer which is utilized in the bulking mode of the apparatus and which will be described in connection with the operation of that mode, in a later portion of this description.

An AM contact in line 6 of the diagram is closed which conducts current through a stop switch PB2 and a forward and reverse switch for operation of the shuttle. An AM contact in line 22 of the diagram is opened in order to divert control of relay CR8 onto the main shuttle DC power switch SW3 in line 21. This switch must be turned on when the shuttle and its belt are to be operated in a manual manner. An AM contact in line 23 is opened to take contact SS10 of the programmer out of the circuit and an AM contact in line 25 is closed in order to put stop switch PB7, forward switch PB8, and reverse switch PB9 for the belt operation into the manual circuit. An AMR1 contact in line 30 of the diagram opens to remove timer TD3 from the cricuit.

As the AM contact in line 6 is closed, current is applied from wire 4 through the shuttle stop push button PB2 in line 6. This switch is normally closed and conducts current to wire 13 in line 6 from where it goes to the normally opened forward push button PB3 in line 6 and the normally opened reverse push button PB4 in line 9. When PB3 is pressed, current is applied through a normally closed contact TD2 in line 4 and normally closed contact LR1 to the normally opened contact CR13 in line 4. Since the DC power switch in line 21 is turned to its on position, relay CR8 in line 21 is energized to close its contacts in the diagram of FIG. 8C and thereby conducts power to the motor control circuit for the main shuttle. Relay CR13 is thereby energized and closes its contact in line 4 of the drawing to energize relay CR1 and TD1 and the directional indicating light PL2 in lines 4 to 6 of the drawing. This operates the shuttle to travel in the direction of arrow A. The only function of the timer TD1 in the manual mode of operation is to close an instantaneous contact around the forward switch PB3 in line 6. This contact acts as a holding circuit so as to allow the PB3 switch to be released after it is pushed.

When the shuttle reaches the limit switch LS1F, the LR relay is energized and the shuttle stops because the reverse circuit is not completed as it is in automatic cycle, i.e., contact AM in line 8 has been energized open by the positioning of the mode selector switch in its manual position and no current can be conducted through line 8 until the reverse push button PB4 is actuated. When the switch PB3 is pressed, the shuttle will run in the direction of arrow B. A current is applied from wire 13 to CR2, TD2 and the directional indicating light PL3 in lines 8–10 of the drawing. When the limit switch LS1R is closed by the shuttle moving in the direction of arrow B, the contact LR2 in line 8 is opened and the shuttle is stopped.

The shuttle may be stopped at any time by the pressing of the stop push putton PB2 in line 6 of the drawing. This breaks the current path to the forward and reverse switches. This momentarily drops out the TD1 and TD2 contacts around the forward and reverse switches so that the shuttle will stop and not restart.

When the AM contact in line 25 closes, a current is applied through the stop switch PB7 in line 25 to the circuits for operating the shuttle belt. When the forward switch PB8 is closed, current is supplied to the coil LBF to run the belt in the direction of arrow A. When LBF is energized, it closes its contact LBF in line 26 to complete a latching circuit around the forward push button so that the belt will operate in a forward manner until the stop button is depressed, thereby opening the circuit to drop out the forward coil. If the reverse switch PB9 is closed, current is conducted to the reversing coil LBR of the belt motor such that the belt is run in the direction of arrow B. The reverse switch also has a holding circuit completed through contact LBR of the reverse coil which is closed when that coil is energized. The belt will run in a reverse direction again until the stop button switch PB7 is opened, thereby dropping out the reverse coil and opening the holding contact LBR in line 28. The speed of the belt in either the forward or reverse direction is controlled through the speed control unit, as previously described with the unit controlling the belt to operate at a desired speed.

Thus, by positioning the mode selection switch into its manual position and by closing the contacts of the main shuttle DC power switch in line 21, the direction of movement of both the shuttle and the belt may be independently controlled as desired. The shuttle may be moved and the belt energized to deposit tabacco into any area which was not completely filled during a filling operation of either a blending or a bulking nature. This manual mode also enables an operator to check out the various movements of a shuttle and the belt.

When the silo is to be operated in a bulking manner so as to store a singular type of tobacco, for instance, the mode selecting switch is positioned so as to close the contacts in line 4 of the diagram to conduct current from wire 4 to wire 6 and the contact between lines 5 and 6 of the diagram so as to conduct current from wire 4 to wire 6a. The bulking cycle is controlled by a programmer which includes a coil with an interrupter and, in addition, 14 wheels. Such programmers are well known in the art. Each wheel has twelve possible steps that can be broken out so as to enable a microswitch type of contact to close only when the wheel is broken (or programmed) out. Therefore, a particular SS contact of the microswitch type is only actuated when the portion of the wheel associated with that contact is broken out. The portions of the wheels are broken out in an order outlined on the print chart of FIG. 9, and the programmer is operable to close or open the various contacts which in turn control the various movements of the belt and shuttle when operated in a bulking mode.

It will become apparent to one of ordinary skill in the art that the various wheels of the programmer may have different portions broken out so as to control the silo apparatus in any desired manner. The following description of the bulking operation will be the operation of the silo when it bulks tobacco so that the first tobacco deposited into the silo is the first tobacco discharged from the silo. It will be readily apparent to one of ordinary skill in the art that the various wheels of the programmer could be positioned so as to close the contacts to control the silo to fill from an opposite end so that the last tobacco deposited into the silo is the first to be discharged.

The mode selecting switch, in its position for a bulking mode, connects current through wire 6 and through timer contact TD8 in line 4 to wire 6B. The timer contact TD8 is supplied so that the shuttle will not begin to move when the bulk storage start push button PB6 (line 16) and the manual step push button PB10 (line 16) are pressed. When the bulk storage start push button PB6 is depressed, the programmer coil SS in line 16 of the drawing is energized through its interrupter contacts. These contacts are closed in every position except step 1 of the cycle. Therefore, the programmer, when positioned anywhere except step 1, will step itself to step 1 through its interrupter. Of course the interrupter wheel could be broken out so the programmer would step itself only to the next position in a plurality of desired starting positions.

In step 1, both contacts SS1 and SS2 in lines 4 and 8, respectively, are closed. The last position of the latch relay determines the direction in which the shuttle will first start. If LR1 is closed in line 4 the shuttle will first travel in the direction of arrow A. If LR2 in line 8 is closed, the shuttle will first travel in the direction of arrow B. The bulking cycle is started when the end 30 of the shuttle is positioned adjacent the discharge end 26 of the silo. The silo is filled from this end toward the other end 27. Once the shuttle hits limit switch LS2, which is placed so as to be closed when the end of shuttle 30 is moved to the end 26 of the silo, the contact LS2 in line 17 is closed. Current is conducted through line 17 of the drawing by way of contact TD7 which is closed when the timer TD7 is energized in line 11 and contact SS5 which is closed in step 1 of the cycle. Current is then conducted from line 17 to the SS coil in line 16 and the programmer is advanced one step to step 2. In this step, SS3 in line 12 is closed, thereby putting a photoelectric cell PE-1 into the circuit. This photoelectric cell is located on the shuttle and projects a beam across the silo which beam may be broken by the tobacco deposited into the silo and reaching a desired height. When this photocell beam is broken, its contact in line 12 is closed and thereby voltage is applied to wire 14 which connects through line 8 to energize the shuttle motor to drive it in the direction of arrow B. Also, in step 2 contact SS7 in line 15 is closed so as to energize the SPCR in that line. This relay, when energized, puts another speed potentiometer in control of the speed output 66 in the circuit of the shuttle motor control. The speed potentiometer is set lower than the one used at other times in the control. Therefore, when the photocell 1 moves the shuttle car in the direction of arrow B, it does so at a much slower speed than the car normally travels.

When the programmer goes into step 2 and the SS7 contact in line 15 closes, the relay CR12 in line 20 is closed. When relay CR12 is energized, its contact in line 19 is opened. However, since the contact CR12 in line 20 is closed, relay CR12 becomes locked in and connected to power through wire 6A by virtue of closed contact SS13 in line 35 of the diagram. This relay CR12 is used to parallel its contacts around contacts LR1 and LR2 in lines 4 and 8 of the diagram. This serves to remove the effect of the LR1 and LR2 contacts of the latching relay from the circuit when the apparatus is operated in a bulking mode and allows the programmed closing of SS1 and SS2 in lines 4 and 8 of the diagram to control the reversing action of the shuttle.

As the tobacco is deposited into the silo, the beam of light of photocell 1 is broken and the photocell contact PE1 in line 12 is closed in order to move the shuttle in the direction of arrow B at a slow speed. The car will move in this direction and then stop when the contact is opened by virtue of the reclosing light beam of photocell 1. Thus the shuttle will move in the direction of arrow B, stop, then move again in the direction of arrow B as the photocell beam is alternately broken and closed by virtue of the tobacco being piled up. These alternate actions will continue until limit switch LS3 at end 27 of the silo is closed. The limit switch LS3 is positioned to be closed by the end 31 of the shuttle contacting it. This limit switch LS3 has a contact on line 18 which is placed into the circuit by virtue of the closing of SS6 which is closed by the programmer in step 2. This limit switch, when closed, conducts current to the programmer coil SS in line 16 of the diagram and thereby advances the programmer to step number 3.

In step number 3, the speed relay SPCR in line 15 is out of circuit since the contact SS7 is opened in this step. The contact SS1 closes in line 4 as does the contact SS2 in line 8. This causes the car to return in the direction of arrow A at high speed. The belt forward contact SS8 in line 24 remains closed and the belt continues to run in the direction of arrow A. As the limit switch LS3 closes, SS5 in line 17 closes and SS6 in line 18 opens, thereby putting limit switch LS2 back into the circuit. When the shuttle returns to the end 26 of the silo, it closes the limit switch LS2. This limit switch, when closed, energizes the programmer coil again and advances it to step number 4 in which step the shuttle is energized to run in the direction of arrow B again at slow speed but under the control of photoelectric cell PE2. The belt also reverses to run in the direction of arrow B. This photoelectric cell is located at the end 31 of the shuttle and is mounted so as to be broken by tobacco piling up beneath it. The cell PE2 controls the silo fill from its central portion to its end 27 just as the photocell PE1 controls the fill of the silo from its discharge end to its central portion.

When the limit switch LS5 at end 27 of the silo is closed, it controls the shuttle to travel again at high speed in the direction of arrow A until the limit switch LS2 is closed (step 5). Switch LS5 has become operable by virtue of the closing of control SS4 in line 14 as will be explained.

The next step 6 is used for the overlay of the original fill. This overlay is made in order to fill up those areas of the previous tobacco fill which have perhaps settled. After the photocell PE1 has moved the car in the direction of arrow B on the south overlay cycle, the limit switch LS3 is again closed to send the shuttle at high speed in the direction of arrow A (step 7).

In step number 8, the shuttle, now controlled by photocell PE2, is operable to put an overlay on the second half of the silo fill. At this time the limit switch LS5 is again in the circuit as the car heads in the direction of arrow B due to contact SS4 being closed. This limit switch LS5 is physically located further toward the central portion of the silo than is the limit switch LS3. Thus, when the limit switch LS5 is closed sooner on the travel of the shuttle in the direction of arrow B, than the limit switch LS3 closed, it energizes the programmer to advance it to step 9. The only programmer contacts which are actuated in step 9 are SS10 and SS11 which are used to disconnect the belt. These contacts are located in lines 23 and 27 of the diagram. Therefore, when the limit switch LS5 is closed, the programmer shuts down everything in operation and this ends the bulk storage cycle.

It will be noted that the shuttle and the placement of the limit switch LS5 are designed so that, when the shuttle is filling the portion of the silo from the discharge end to the central portion, the shuttle may move in the direction of arrow B completely from beneath the discharge point of the cross-shuttle, thereby allowing the central portion of the silo to be filled. Since the limit switch LS5 is placed further toward the central portion of the silo than is limit switch LS3, when the shuttle is operating in the steps 4 and 8 of the cycle to fill the portion of the silo between the central portion and the end 27 thereof, the limit switch is closed prior to the time that the shuttle would uncover the central portion of the silo for direct filling by the cross-shuttle and an overfill at the central portion is thus obviated.

The silo may be discharged by virtue of the circuits shown in lines 32-34 of the circuit diagram. The switch SW4 is moved so as to close its contacts in line 32 and thereby conduct current to wire 3A and to the switch SW5. The switch SW5 has a run position and a remote position. When in the run position, the switch is operable to conduct current from 3A to wire 56 which in turn conducts current to slat conveyor switch SW7 and to the doffer switch SW6. When the doffer off-on switch SW6 is closed, current is applied to timer TD4 (line 33) which has a time contact in line 32 of the diagram. This contact is closed and is timed to reopen on de-energization of TD4 and serves to keep the doffer drive motor running for a period after the slat conveyor stops. Closing of this contact TD4 energizes the doffer motor on line 32 and the indicating light PL6 which shows that the doffers are running. An auxiliary rotary contact on the doffer motor starter in line 34 closes as does the instantaneous timer contact TD4 on line 34. When the switch SW7 is closed, the circuit is completed to relay CR7 in line 34 which is operable to apply current to the slat conveyor motor control which also includes a common SCR as shown in FIG. 8D of the diagram. When the circuit is energized, relay CR14 is energized, which operates to close its contacts CR14 in line 34 of the drawing, thereby energizing the operating indicating light PL7 to indicate that the slat conveyor is running. For energizing the doffer and slat conveyor discharge to run automatically, terminals 49 and 57 are provided which can be connected to an external source. These are operable to control the running of the doffer motor and the slat motor when the switch SW5 is in its remote position.

As previously but indirectly indicated, the drive motors of the main shuttle and of the slat conveyor are controlled by circuits utilizing SCR units which are shown diagrammatically in FIGS. 8C and 8D of the drawing for the purpose of clarity. It is to be understood that any drive control circuits operable to control the motors in the manner described may be substituted or utilized.

The control circuit described has several other features including at line 35 an indicating light PL8 which indicates that the silo is filling. The contact SS13 in line 35 is closed during the first eight steps of the programmer as shown by the programmer chart in FIG. 9 of the drawing, such that this light is on for all filling steps. In line 36 of the diagram, there is depicted a limit switch LS6 which is closed when the shuttle nears the end of its last filling step. LS6 is connected to an alarm which sounds to indicate that a predetermined time remains for the filling of the silo. This alarm is operable only when the contact SS12 in line 36 is closed. It can be seen from the programmer chart in FIG. 9 of the drawing that this contact is closed only in step 8 of the cycle so that, even though LS6 may be closed during other portions of the cycle, it is not operable to actuate the alarm until step 8 of the cycle is reached. This alarm indicates that the silo is near its filled condition and alerts an operator to that fact.

Emergency overrun limit switches LS7 and LS8 are positioned at the extreme ends of the silo and outwardly from both the central portion and the operating limit switches LS1F, LS1R, LS2, and LS3. The limit switches LS7 and LS8 serially connect two points in wire 4 of the diagram and are opened if the shuttle should by some malfunction overrun its normally operating limit switches. If either limit switch LS7 or LS8 is opened, the circuit through wire 4 of the diagram is opened and the operation of the shuttle will thereby be halted. This prevents the shuttle from overrunning its desired position and from damaging any of the equipment.

An emergency stop switch PB1 is located in line 4 of the diagram and may be depressed in order to immediately shut down the operation of the silo in case of an emergency. The timer contact TD7 in line 19 is provided so that, if the shuttle is near the end of one of its runs when the emergency switch is depressed, the shuttle continues for a short distance so that the pertinent operating limit switches will be actuated while current is still present, so as to energize the programmer coil SS. Thus, upon the restarting of the shuttle, it will not continue to run toward an extreme position past one of the operable limit switches as it would if the limit switch was tripped by the coasting motion of the shuttle after the direct power to the switch was cut off.

An additional feature is that of a photoelectric cell override switch PB5 shown in line 10 of the circuit diagram. This is provided to enable the processor to move the shuttle over an area quickly when the shuttle is being controlled by the photocells at a slower rate of speed. The need for this control arises, for instance, where the shuttle was operating in a bulking mode and the program was interrupted by use of the manual controls to skip a step or for other reasons. When the shuttle control is returned to the bulking mode, the photoelectric cell override button may be depressed to bypass the photocells, thereby conducting current to the shuttle motor control independently of the photocells so that the shuttle is moved away from previously filled areas. This enables the processor to control the shuttle to avoid placing new or "hot" tobacco from previous processing steps on top of "cold" tobacco or tobacco which has already been cooled. Thus, merely by returning the mode select switch SW2 from its "manual" to its "bulking" position, and by depressing the photocell override switch PB5, the shuttle may be returned to a desired position for continuance in a bulking mode without the need to independently position it and the belt by operating the various manual controls.

The silo of the alternate embodiment utilizing the central discharge as shown in FIG. 10 is operated and controlled in the same manner as in the preferred embodiment with the exception that the programmer is set to continuously utilize limit switch LS-5 in the circuit. This prevents the shuttle from uncovering the central area of the silo and allowing tobacco to fall onto the discharge conveyor directly from the tobacco infeed.

Having described my invention in detail, other modifications and variations will become apparent to those of ordinary skill in the art without departing from the scope of my invention, and I intend to be bound only by the scope of the appended claims.

I claim:

1. A method of depositing a substantially level fill of tobacco or the like into a silo prior to complete discharge of the fill from the silo comprising the steps of feeding tobacco onto a first conveyor carried on a shuttle having at least one discharge end and being located above a silo having two ends,
moving the shuttle over the silo and between the ends of the silo while moving the conveyor with respect to the shuttle and discharging tobacco on the conveyor into the silo in order to fill the silo,
detecting low spots in the tobacco fill of the silo,
moving a discharge end of the shuttle over said low spots and moving said conveyor to fill said low spots in order to provide a substantially level surface throughout the length of the fill, and
thereafter discharging the tobacco fill from the silo.

2. A method as in claim 1 wherein moving the shuttle includes reciprocating the shuttle between the ends of the silo and moving the conveyor in order to fill at least one portion of said silo by depositing a plurality of layers into said portion.

3. A method as in claim 1 wherein moving the shuttle includes progressively moving the shuttle from one end of the silo toward an opposite end, and moving the conveyor in order to fill at least a portion of said silo by depositing a single layer of tobacco therein, said layer having a thickness approximately equal to the thickness of said fill.

4. The method of claim 1 wherein said step of detecting low spots includes detecting said low spots without physically engaging said tobacco fill.

5. A method of depositing a substantially level fill of tobacco or the like, the composition of which varies from time to time between a single type and a plurality of types, into a silo, said method comprising
storing the tobacco in a silo when the tobacco is of the same type by
feeding it onto a first movable conveyor carried on a first shuttle located above a silo,
operating the conveyor in a direction toward an end of the shuttle located over the portion of the silo to be charged with tobacco of the same type while moving said end of said shuttle progressively over the portion of the silo to be charged to charge that portion with tobacco; and
blending tobacco into the silo when the tobacco is of a plurality of types by
feeding the tobacco of such types onto the first conveyor,
reciprocating the first shuttle in first and second directions between the ends of the silo, while operating the conveyor in a direction toward the portion of the silo to be charged to deposit layers of tobacco into the silo,
and after said storing or said blending,
detecting low spots in the tobacco fill of the silo, and
moving a discharge end of the shuttle over said low spots and moving said conveyor to fill said low spots in order to provide a substantially level surface throughout the length of the fill.

6. The method of claim 5 wherein the storing step comprises the steps of
operating the first conveyor in a first direction while moving the shuttle progressively in a second direction to charge a first portion of the silo, and
returning the shuttle in the first direction and then operating the conveyor in a second direction while moving the shuttle progressively in a second direction to charge a second portion of the silo, and
after detecting and filling said low spots, ceasing all steps for depositing tobacco into the charged portion of the silo, and discharging said substantially level fill of tobacco from said silo.

7. The method of claim 5 wherein the blending step comprises the steps of
operating the first conveyor in a first direction while moving the first shuttle in the first direction to deposit a layer of tobacco into one portion of the silo, then operating the conveyor in a second direction while moving the shuttle in a second direction in order to deposit a layer of tobacco into a second portion of the silo so that one layer of tobacco is deposited over the length of the silo,
continuing these movements to deposit a plurality of layers over the length of the silo, and
after detecting and filling said low spots, ceasing all steps for depositing tobacco into the charged portion of the silo and discharging said substantially level fill of tobacco from said silo.

8. The method of claim 5 wherein the blending step comprises
operating the conveyor continuously in one of said first or second directions while reciprocating the shuttle and thereby depositing layers of tobacco into a selected portion of the silo, and
after detecting and filling said low spots, ceasing all steps for depositing tobacco into the charged portion of the silo and discharging said substantially level fill of tobacco from said silo.

9. The method of claim 5 further including the step of discharging tobacco from the silo in a direction generally parallel to said surface.

10. A method of depositing a substantially level fill of tobacco or the like into a silo and of discharging tobacco from the silo, the method comprising the steps of
feeding tobacco onto a first conveyor carried on a shuttle having at least one discharge end and being located above a silo having two ends,
moving the shuttle over the silo and between the ends of the silo while moving the conveyor with respect to the shuttle and discharging tobacco on the conveyor into the silo in order to fill the silo,
detecting low spots in the tobacco fill of the silo,
moving a discharge end of the shuttle over said low spots and moving said conveyor to fill said low spots in order to provide a substantially level surface throughout the length of the fill, and
discharging the tobacco fill from the silo in a direction generally parallel to said surface.

* * * * *